United States Patent [19]

Winkelbauer et al.

[11] Patent Number: 4,500,644

[45] Date of Patent: Feb. 19, 1985

[54] PREPARATION AND COMPOSITION OF SIALON GRAIN AND POWDER

[75] Inventors: Howard M. Winkelbauer, West Mifflin, Pa.; Kenneth W. Hill, Lynchburg, Va.; Ke-Chin Wang, Pittsburgh, Pa.

[73] Assignee: Dresser Industries, Inc., Dallas, Tex.

[21] Appl. No.: 562,770

[22] Filed: Dec. 19, 1983

[51] Int. Cl.³ .............................................. C04B 35/58
[52] U.S. Cl. ...................................... 501/98; 501/151
[58] Field of Search ......................... 501/98, 153, 151; 423/344

[56] References Cited

U.S. PATENT DOCUMENTS 4,184,884  1/1980  Jong ..................................... 264/65
4,243,621  1/1981  Mori et al. ........................... 264/65

Primary Examiner—Helen M. McCarthy
Attorney, Agent, or Firm—Barry E. Deutsch

[57] ABSTRACT

Dense sialon grain is produced by briquetting mixtures of micronized silicon and reactive alumina. Sialon powder is produced by ball milling the briquettes after nitriding. The starting mixtures can contain from 10 to 38% reactive alumina with the balance of the mixture micronized silicon. Mixtures made within this range when pressed into dense briquettes and nitrided produce useful sialon grain having minimal free alumina contamination.

8 Claims, No Drawings

4,500,644

PREPARATION AND COMPOSITION OF SIALON GRAIN AND POWDER

TECHNICAL FIELD

This patent concerns the preparation and composition of dense sialon grain by premixing micronized silicon and fine reactive alumina, forming a compact from this mixture, and firing the compacts in the presence of nitrogen. Sialon powder is produced by ball milling the compact.

BACKGROUND ART

Because of their high sintered density and inertness, sialon ceramic materials may potentially be used in many refractory and engineering applications. The term sialon is an acronym for a phase which contains the elements silicon, aluminum, oxygen and nitrogen. Sialon can also be described as a solid solution of alumina in silicon nitride. Appreciable amounts of solid solutioning produces a recognizable phase called $\beta'$ sialon. This phase can hold up to 60% alumina in solid solution. Amounts greater than 60% are exsolved and occur as free alumina. Numerous other sialon phases arise in the sialon system depending on the relative proportions of the starting materials and the amounts of AlN or oxygen present during formation of sialon.

Most prior art techniques relating to methods of preparing sialon involve the use of expensive starting materials, such as silicon nitride, and/or aluminum nitride. Only a few researchers have studied lower cost means of producing high purity sialon. U.S. Pat. No. 4,243,621 to Mori et al teaches a method of preparing sialon by premixing two metals (Si+Al) and an oxide, forming a shape, and firing this shape in a nitrogenous atmosphere. U.S. Pat. No. 4,184,884 to Jong, teaches a method of making sialon by using silicon, alumina and aluminum or aluminum nitride.

Disadvantages of the prior art techniques include the use of high cost starting materials, the use of aluminum metal which has severe limitations due to its explosive tendency, and the use of aluminum nitride due to its high cost and tendency to react with moisture. Attempts to produce commercial quantities of sialon based on prior art techniques would be prohibitively expensive. Therefore, it is an object of this invention to provide a method of preparing high purity sialon at relatively low cost.

SUMMARY OF THE INVENTION

The present invention achieves the foregoing objectives in a method for producing nitride bonded ceramic grain comprising the steps of mixing, a composition consisting essentially of, by weight, 62 to 90% micronized silicon powder, and about 10 to 38% fine grain alumina powder; ball milling the composition to thoroughly disperse the silicon and alumina powders; briquetting the composition to form a relatively dense compact grain; and burning the compact grain at an elevated temperature in a nitriding atmosphere to form the nitride bond.

Further, a nitride bonded ceramic grain which obtains the above objectives, is made from a batch consisting essentially of, by weight, 62 to 90% micronized silicon powder, and about 10 to 38% fine grain alumina powder.

DESCRIPTION OF THE PREFERRED EMBODIMENT

The present invention provides a method of preparing sialon from relatively low cost starting materials and from materials that are easily handled in a production environment. The invention also relates to a sialon grain composition having the above attributes.

Silicon and alumina powders are blended in an approximate ratio of 70:30 weight percent and mixed with a temporary organic binder, such as methocel or hydroxyethyl cellulose. The mix is then densified by briquetting to form a compact. The briquettes are dried and then fired to above 1260° C. in a nitrogenous atmosphere until all the metal has nitrided. The briquettes are then given a high temperature treatment beyond the melting point of silicon to facilitate solutioning of alumina in silicon nitride. Since the kinetics for complete solid solutioning are sluggish, trace to minor amounts of free alumina in the sialon briquettes are unavoidable. It is the intent of this invention to keep the free alumina content in the sialon briquette at a minimum without firing to excess temperatures (beyond 1650° C.). A convenient way to keep the free alumina content at a minimum is to add alumina to the mix in amounts which will yield less than 60% solid solution.

Instead of briquetting the mix, the mix may be power pressed to form a dense plate or slab. This approach provides more uniform nitridation reaction, since the plates can be placed in the nitriding furnace in a manner wherein the flowing nitrogen gas is uniformly available about all surfaces of the plate.

The silicon powder used to make sialon should be essentially −325 mesh Tyler Standard and of relatively High purity. Silicon powder shown in Table I is of acceptable quality. It is of importance that lime in the starting materials be kept to a minimum as it is known to be detrimental to the refractoriness of sialon. The alumina used to make sialon should be of the reactive type (Table I). In an effort to minimize impurities, the binder used in compaction of the powders should have a very low ash content. To aid uniformity, the powders should be dried at 121° C. for a minimum of eight hours.

EXAMPLE I

Micronized silicon (45.1 weight %), Alcoa's A-15SG alumina (54.9 weight %), and iron metal −325 mesh (0.23 weight %) were blended in a mixer and tempered with 12% of a 3% hydroxyethyl cellulose solution. Compacts were made by passing this mixture through a briquetter set at a forming pressure of 141 kg/cm². The briquettes had a green density of 2.13 g/cc. They were dried and then heated in the presence of flowing nitrogen using Schedule A (Table II). The density after nitriding was 2.43 g/cc, the apparent porosity was 26.4%, the nitrogen content was 21%, and X-ray diffraction analysis indicated the major phases were $\alpha$ $Si_3N_4$ or $\beta$ $Si_3N_4$, sialon; corundum, with $Si_2ON_2$ as an accessory phase. Polished section examination of the nitrided briquette showed poor dispersion of alumina.

EXAMPLE II

To decrease the amount of unreacted alumina in the briquette, less alumina was used in the starting mixture. Further, it is known that, at firing temperatures under 1650° C., it is difficult to achieve complete solid solutioning of fine powders because of compaction difficulties. Therefore, the area of solid solution of less than 0.67 Si$_3$N$_4$: 0.33 alumina (62 weight % silicon: 38 weight % alumina) was investigated. Micronized silicon and Alcan's (71FG alumina (71.4:28.6 weight %) were ball milled for two hours with additions of 0.36% iron metal −325 mesh and 0.24% methocel. After ball milling, the mixture was blended with 12% water for 15 minutes, then briquetted at 141 kg/cm$^2$. The briquettes has a green density of 1.89 g/cc. Nitriding was done according to Schedule A. After nitriding the briquettes had a weight gain of 45%, a density of 2.45 g/cc, an apparent porosity of 21.2%, and a nitrogen content of 29%. X-ray diffraction analysis revealed both α Si$_3$N$_4$ and β Si$_3$N$_4$ or sialon were the major phases. Silicon oxynitride and corundum were present as weak reflections. A group of the same briquettes were nitrided according to Schedule B. This higher firing temperature had little effect on physical properties, but had a significant effect on the phase assemblage. Now β Si$_3$N$_4$ or sialon was the only major phase. Very weak reflections of α Si$_3$N$_4$, Si$_2$ON$_2$, and corundum were detected. However, these briquettes were glazed and some had nodules of silicon on their surfaces.

EXAMPLE III

A mix was formulated as illustrated in Example II, but with elimination of the iron metal addition. Nitriding was done according to Schedule A. No significant difference in nitrogen content or other properties were detected in the fired product compared to the briquette with the iron addition. Briquettes lacking the iron addition were also fired at Schedule B. Firing at this higher schedule resulted in poor properties. As seen before, the briquettes were glazed and nodules of silicon occurred on the sufaces. The briquettes had a density of 2.40 g/cc and an apparent porosity of 23.2%. Briquettes were also fired at Schedule C. When fired at this lower temperature, the briquettes had a density of 2.56 g/cc and an apparent porosity of 18.9% . Schedule C made briquettes with less α Si$_3$N$_4$.

EXAMPLE IV

A finer grained alumina than that used in Examples I, II and III was investigated in an effort to further increase the yield of sialon. Micronized silicon and Alcoa's A-16SG were blended in a ratio of 71.4:28.6 weight %. Additions of 0.36% iron metal −325 mesh and 0.24% methocel were added to the mix. Instead of ball milling, the powders were simply dry mixed for 45 minutes in a Hobart mixer and then mixed for another 45 minutes after a 12% addition of water. After briquetting at 141 kg/cm$^2$ alumina agglomerates were clearly visible in broken sections. This indicated that ball milling of the powders was a necessary step to insure dispersion of the powders. Briquettes of this formulation, after ball milling and briquetting, had a green density of 1.92 g/cc. After nitriding, according to Schedule C, the briquettes had a weight gain of 43%, a density of 2.72 g/cc, an apparent porosity of 12.2%, and a nitrogen content of 32%. This was a significant improvement over the mix shown in Example III with the coarser grained alumina and fired to Schedule C. This data suggested that the finer grained Alcoa's A-16SG alumina was more reactive and aided sintering. Mircroprobe examination of the nitrided briquette showed little free alumina. Alumina was, however, uniformly dispersed in the nitride phases.

EXAMPLE V

To further investigate the effect of the fineness of the alumina addition, an extremely fine grained alumina was used. Micronized silicon and Alcoa's A-16SG alumina (71.4:28.6 weight %) were ball milled for two hours with 0.24% methocel. Further mixing was done for 45 minutes after an addition of 12% water. After briquetting at 141 kg/cm$^2$, the briquettes had an acceptable density of 1.92 g/cc. After nitriding at Schedule C, the briquettes had a density of 2.56 g/cc and an apparent porosity of 16.9%. The reason for a density loss in this mix and subsequent mixes using finer alumina was not fully understood.

EXAMPLE VI

The use of nitriding aids other than iron metal was investigated. It was assumed that if nitriding could be completed earlier with the use of an aid, more time would be available for solutioning of alumina in silicon nitride without extending the firing schedule. Addition of a preformed silicon nitride "seed" was attempted first. Micronized silicon and Alcoa's A-16SG alumina (71.4:28.6 weight %) were ball milled with an addition of 1.0 weight % GTE silicon nitride −325 mesh and 0.24 weight % methocel. Mixing, briquetting and nitriding were done as illustrated in Example V. No significant differences were observed in the fired briquettes compared to the standard made without the "seed". Another mix was made in the same manner, but with an addition of ½ weight % calcium fluoride. This addition did not have an effect on weight gain, density, nitrogen content or phase assemblage, but did, however, have a noticeable change on the porosity and specific gravity of the briquette. With the ½% addition of calcium fluoride, the apparent porosity decreased from 17.3 to 14.2% and the apparent specific gravity decreased from 3.09 to 2.99. Another mix was also made with an addition of ½ weight % aluminum fluoride. This addition appeared to have a similar effect.

Firing Schedule C appeared to be advantageous for nitriding small quantities of Si/Al$_2$O$_3$ briquettes. It is realized that variations in Schedule C may be necessary for nitriding commercial quantities because of the exothermic nature of silicon nitridation.

TABLE I

| Chemical Analysis and Particle Size Distribution of the Starting Materials | | | | |
| --- | --- | --- | --- | --- |
| Material: | Micronized Silicon | Reactive Alumina | Reactive Alumina | Calcined Non-Reactive Alumina |
| Supplier: | Globe Metallurgical Co. | Alcoa A-15SG | Alcoa A-16SG | Alcan C-71FG |
| Chemical Analysis (Calcined Basis) | | | | |
| SiO$_2$ | — | 0.04% | 0.04% | 0.02% |
| Al$_2$O$_3$ | 0.67% | — | — | — |
| TiO$_2$ | 0.03 | — | — | 0.01 |
| Fe$_2$O$_3$ | 0.36 | 0.02 | 0.02 | 0.04 |
| CaO | 0.10 | 0.01 | 0.01 | 0.02 |

TABLE I-continued

Chemical Analysis and Particle Size Distribution of the Starting Materials

| | | | | |
|---|---|---|---|---|
| MgO | 0.02 | 0.02 | 0.05 | 0.02 |
| Na₂O | — | 0.08 | 0.08 | 0.19 |
| Total Analyzed | 1.18 | 0.17 | 0.20 | 0.30 |
| By Difference | | | | |
| SiO₂ | 99.82 | — | — | — |
| Al₂O₃ | — | 99.83 | 99.98 | 99.70 |
| Total | 100.00% | 100.00% | 100.00% | 100.00% |
| Particle Size Distribution | | | | |
| X-ray Sedigraph | | | | |
| % Particles Finer than 40.0 microns | 100 | 100 | 100 | 100 |
| % Particles Finer than 20.0 microns | 95 | 100 | 100 | 99 |
| % Particles Finer than 10.0 microns | 76 | 98 | 100 | 94 |
| % Particles Finer than 5.0 microns | 51 | 83 | 98 | 59 |
| % Particles Finer than 2.5 microns | 30 | 53 | 95 | 15 |
| % Particles Finer than 1.0 microns | 12 | 38 | 83 | 2 |

TABLE II

Nitriding Schedules

Schedule A
room temperature–1260° C. at 38° C./hr.
3 hr. hold at 1260° C.
1260–1316° C./hr.
8 hr. hold at 1316° C.
1316–1371° C. at 10° C./hr.
8 hr. hold at 1371° C.
1371–1427° C. at 10° C./hr.
4 hr. hold at 1427° C.

Schedule B
Same as above except add:
1427–1593° C. at 10° C./hr.
2 hr. hold at 1593° C.

Schedule C
room temperature–1260° C. at 38° C./hr.
3 hr. hold at 1260° C.
1260–1316° C. at 10° C./hr.
8 hr. hold at 1316° C.
1316–1371° C. at 10° C./hr.
8 hr. hold at 1371° C.
1371–1399° C. at 10° C./hr.
8 hr. hold at 1399° C.
1399–1538° C. at 10° C./hr.
10 hr. hold at 1538° C.

Note:
All firings were done under flowing nitrogen.

Prior tests have indicated that at least 10 percent, by weight, alumina powder, is necessary to obtain the desired properties for the sialon grain. In accordance with the foregoing, sialon grain may now be produced from relatively low cost, readily available materials. Further, the materials may be safely and readily handled in a production environment.

While the preferred embodiment of the present invention has been described and illustrated, the invention should not be limited thereto but may be otherwise embodied within the scope of the following claims.

The embodiments of the invention in which an exclusive property or privilege is claimed are defined as follows:

1. A method for producing nitride bonded ceramic grain comprising the steps of:
   mixing, a composition consisting essentially of, by weight, 62–90% micronized silicon powder and about 10 to 38% fine grain alumina powder;
   ball milling the composition to thoroughly disperse the silicon and alumina powders;
   compacting the composition to increase the density thereof; and
   burning the composition at an elevated temperature in a nitriding atmosphere to form the nitride bond.

2. A method in accordance with claim 1 further including the step of adding to the composition about ½ weight percent of an additive from the group consisting of calcium fluoride and aluminum fluoride.

3. A method in accordance with claim 1 wherein the fine grain alumina powder is generally sized between less than one micron and five microns.

4. A method in accordance with claim 1 wherein the silicon powder consists essentially, by weight, about 70 to 75% and the alumina powder consists essentially, by weight, about 25 to 30%.

5. A nitride bonded ceramic grain made from a batch consisting essentially of, by weight, 62 to 90% micronized silicon powder and about 10 to 38% fine grain alumina powder.

6. A nitride bonded ceramic grain in accordance with claim 5 wherein the batch includes an additive of, by weight, ½% from the group consisting of calcium fluoride and aluminum fluoride.

7. A nitride bonded ceramic grain in accordance with claim 5 wherein the fine grain alumina powder is generally sized between less than one micron and five microns.

8. A nitride bonded ceramic grain in accordance with claim 5 wherein the silicon powder consists essentially, by weight, about 70 to 75% and the alumina powder consists essentially, by weight, about 25 to 30%.

* * * * *